United States Patent
Choi

(10) Patent No.: US 12,335,191 B2
(45) Date of Patent: Jun. 17, 2025

(54) ELECTRONIC DEVICE FOR ALLOCATING RESOURCE IN WLAN SYSTEM AND OPERATING METHOD THEREOF

(71) Applicant: SAMSUNG ELECTRONICS CO., LTD., Suwon-si (KR)

(72) Inventor: Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 345 days.

(21) Appl. No.: 17/846,614

(22) Filed: Jun. 22, 2022

(65) Prior Publication Data
US 2022/0393825 A1 Dec. 8, 2022

Related U.S. Application Data

(63) Continuation of application No. PCT/KR2022/007669, filed on May 30, 2022.

(30) Foreign Application Priority Data

Jun. 4, 2021 (KR) .................. 10-2021-0072634

(51) Int. Cl.
*H04L 5/00* (2006.01)

(52) U.S. Cl.
CPC .......... *H04L 5/0051* (2013.01); *H04L 5/0037* (2013.01); *H04L 5/006* (2013.01)

(58) Field of Classification Search
None
See application file for complete search history.

(56) References Cited

U.S. PATENT DOCUMENTS

| | | |
|---|---|---|
| 11,109,236 B2 | 8/2021 | Yerramalli et al. |
| 11,653,345 B2 | 5/2023 | Yerramalli et al. |

(Continued)

FOREIGN PATENT DOCUMENTS

| | | |
|---|---|---|
| AU | 2011211579 | 7/2012 |
| CN | 111431687 | 7/2020 |

(Continued)

OTHER PUBLICATIONS

Search Report dated Aug. 25, 2022 in counterpart International Patent Application No. PCT/KR2022/007669.

(Continued)

*Primary Examiner* — Clemence S Han
(74) *Attorney, Agent, or Firm* — Nixon & Vanderhye, P.C.

(57) ABSTRACT

Various embodiments of the disclosure relate to a device and a method for allocating a resource in a wireless LAN system. An electronic device may include: a memory, a communication circuit, and a processor operatively connected to the memory and the communication circuit, wherein the processor is configured to: receive a reference signal from an external electronic device via the communication circuit, identify channel gains of multiple subcarriers included in a frequency resource through a channel estimation based on the reference signal, identify, based on the channel gains of the subcarriers, subcarriers in which constructive interference is determined to have occurred, configure multiple resource groups each including at least one consecutive subcarrier among the identified subcarriers, and transmit information related to the multiple resource groups to the external electronic device via the communication circuit.

20 Claims, 15 Drawing Sheets

(56) References Cited

U.S. PATENT DOCUMENTS

| | | |
|---|---|---|
| 2006/0146856 A1 | 7/2006 | Jung et al. |
| 2008/0219363 A1 | 9/2008 | Li et al. |
| 2011/0194551 A1 | 8/2011 | Lee et al. |
| 2015/0156728 A1 | 6/2015 | Kwon et al. |
| 2015/0382371 A1* | 12/2015 | Liu .................... H04J 11/0053 370/329 |
| 2016/0174230 A1 | 6/2016 | Benjebbour et al. |
| 2016/0204960 A1 | 7/2016 | Yu |
| 2018/0205442 A1 | 7/2018 | Oteri et al. |
| 2018/0317128 A1 | 11/2018 | Chun et al. |
| 2020/0383133 A1 | 12/2020 | Hu et al. |
| 2020/0403675 A1 | 12/2020 | Yang et al. |
| 2021/0091838 A1* | 3/2021 | Bai .................... H04B 7/0639 |
| 2021/0337549 A1 | 10/2021 | Zhang et al. |
| 2022/0408288 A1* | 12/2022 | Yu .................... H04L 5/0094 |
| 2023/0027718 A1* | 1/2023 | Venugopal ......... H04B 7/06958 |
| 2023/0108591 A1* | 4/2023 | Liao .................... H04B 7/0632 370/329 |

FOREIGN PATENT DOCUMENTS

| | | |
|---|---|---|
| EP | 1 677 478 | 7/2006 |
| WO | 2011/096646 | 8/2011 |
| WO | 2017/069589 | 4/2017 |

OTHER PUBLICATIONS

Written Opinion dated Aug. 25, 2022 in counterpart International Patent Application No. PCT/KR2022/007669.

Deng et al., "Wi-Fi 7: New Challenges and Opportunities", IEEE Communications Surveys & Tutorials, vol. 22, Issue: 4, Fourthquarter 2020, IEEE 802.11be—30 pages.

Extended Search Report dated Jul. 25, 2024 in European Patent Application No. 22816413.3.

* cited by examiner

ELECTRONIC DEVICE FOR ALLOCATING RESOURCE IN WLAN SYSTEM AND OPERATING METHOD THEREOF

CROSS-REFERENCE TO RELATED APPLICATIONS

This application is a continuation of International Application No. PCT/KR2022/007669 designating the United States, filed on May 30, 2022, in the Korean Intellectual Property Receiving Office and claiming priority to Korean Patent Application No. 10-2021-0072634, filed on Jun. 4, 2021, in the Korean Intellectual Property Office, the disclosures of which are incorporated by reference herein in their entireties.

BACKGROUND

Field

The disclosure relates to a device and a method for allocating a resource in a wireless LAN system.

Description of Related Art

Wireless local area network (WLAN) systems may support wireless connection of various electronic devices, such as a smartphone, a tablet personal computer (PC), or a notebook, using a designated frequency band (e.g., about 2.4 GHz and/or about 5 GHz).

WLAN systems may be installed in a public space such as an airport, a train station, an office, or a department store, as well as a private space such as a house. WLAN systems may support an orthogonal frequency division multiple access (OFDMA) transmission scheme to provide efficient wireless communication to multiple electronic devices in an environment, for example, a public space, in which the electronic devices coexist.

When supporting an OFDMA transmission scheme, a WLAN system may divide an available frequency resource and allocate same to multiple electronic devices. For example, an external electronic device (e.g., an access point (AP)) of the WLAN system may divide an available frequency resource in a unit of resource areas (resource units; RUs), and allocate same to multiple electronic devices. An electronic device may perform wireless communication using consecutive subcarriers included in a resource area allocated by the external electronic device (e.g., AP).

The WLAN system (e.g., Wi-Fi 6 standard) may apply the same modulation and coding scheme (MCS) to subcarriers included in the resource area. For example, the subcarriers included in the resource area may have different amplitude fluctuations due to fading (e.g., small scale fading) generated in a wireless environment. When the amplitude fluctuations of the subcarriers included in the resource area are relatively large, the WLAN system may configure an MCS of the subcarriers included in the resource area, based on a subcarrier having the smallest amplitude.

When the WLAN system configures an MCS of the subcarriers included in the resource area, based on a subcarrier having the smallest amplitude in the resource area, the transmission performance of an electronic device to which the corresponding resource area has been allocated may degrade.

SUMMARY

Embodiments of the disclosure provide a device and a method for allocating a resource in a WLAN system.

According to various example embodiments, an electronic device may include: a memory, a communication circuit, and a processor operatively connected to the memory and the communication circuit, wherein the processor is configured to: receive a reference signal from an external electronic device via the communication circuit, identify channel gains of multiple subcarriers included in a frequency resource through a channel estimation based on the reference signal, identify, based on the channel gains of the subcarriers, subcarriers in which constructive interference is determined to have occurred, configure multiple resource groups each including at least one consecutive subcarrier among the identified subcarriers, and transmit information related to the multiple resource groups to the external electronic device via the communication circuit.

According to various example embodiments, a method of operating an electronic device may include: receiving a reference signal from an external electronic device via short-range wireless communication, identifying channel gains of multiple subcarriers included in a frequency resource through a channel estimation based on the reference signal, identifying, based on the channel gains of the subcarriers, subcarriers in which constructive interference is determined to have occurred, configuring multiple resource groups each including at least one consecutive subcarrier among the identified subcarriers, and transmitting information related to the multiple resource groups to the external electronic device.

According to various example embodiments, an electronic device may include: a memory, a communication circuit, and a processor operatively connected to the memory and the communication circuit, wherein the processor is configured to: transmit a reference signal via the communication circuit, receive information related to fading from multiple external electronic devices, based on the reference signal, select an external electronic device to which a wireless resource is to be allocated among the multiple external electronic devices, and allocate a wireless resource to the external electronic device, based on the information related to fading, received from the external electronic device.

According to various example embodiments of the disclosure, an external electronic device (e.g., a transmission node or an access point (AP)) of a WLAN system allocates consecutive or non-consecutive subcarriers to an electronic device, based on information related to fading of the electronic device, so that degradation of the transmission performance of the electronic device can be reduced.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Hereinafter, various example embodiments will be described in greater detail with reference to attached drawings.

Figure 1:
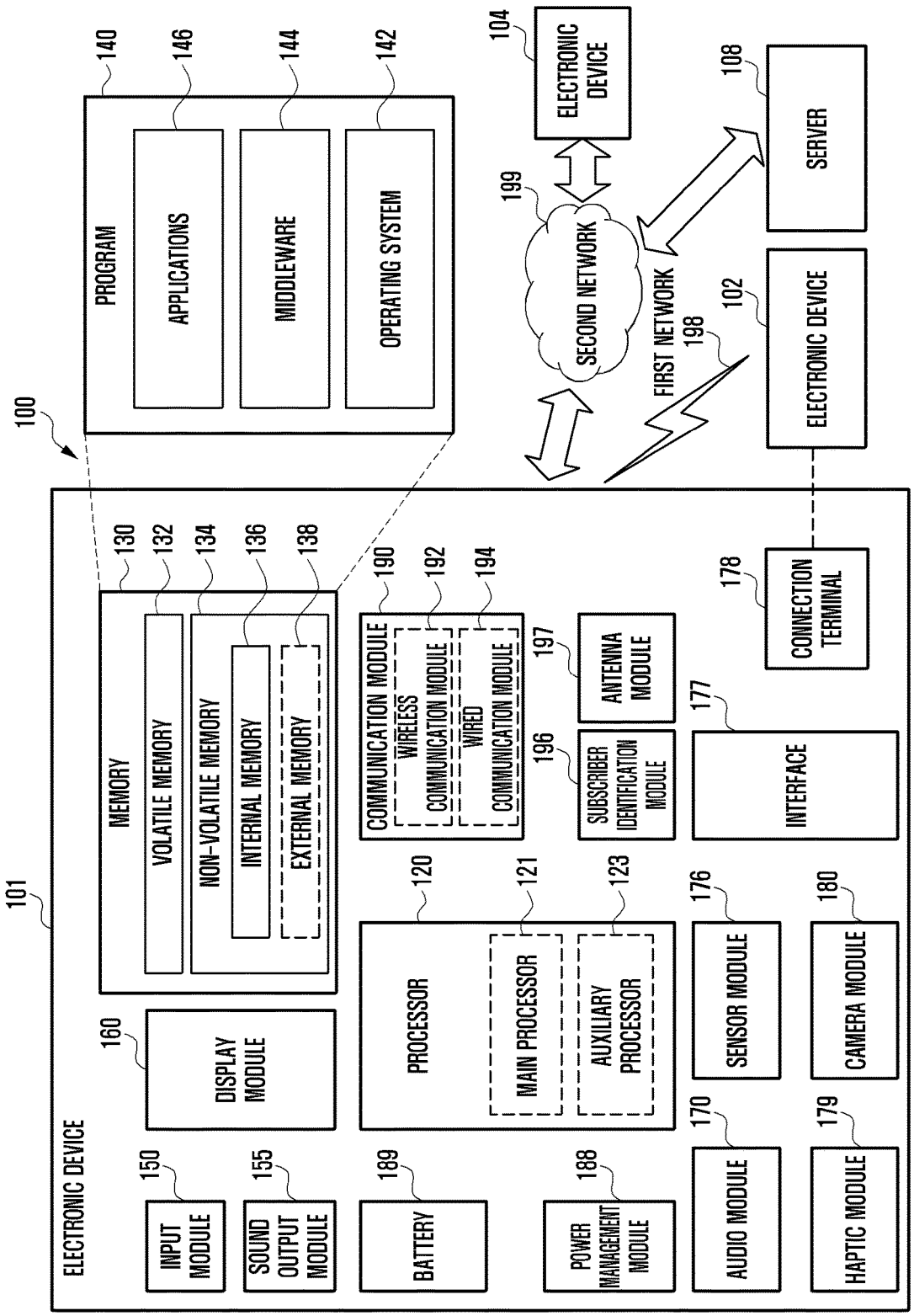
FIG. 1 is a block diagram illustrating an example electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
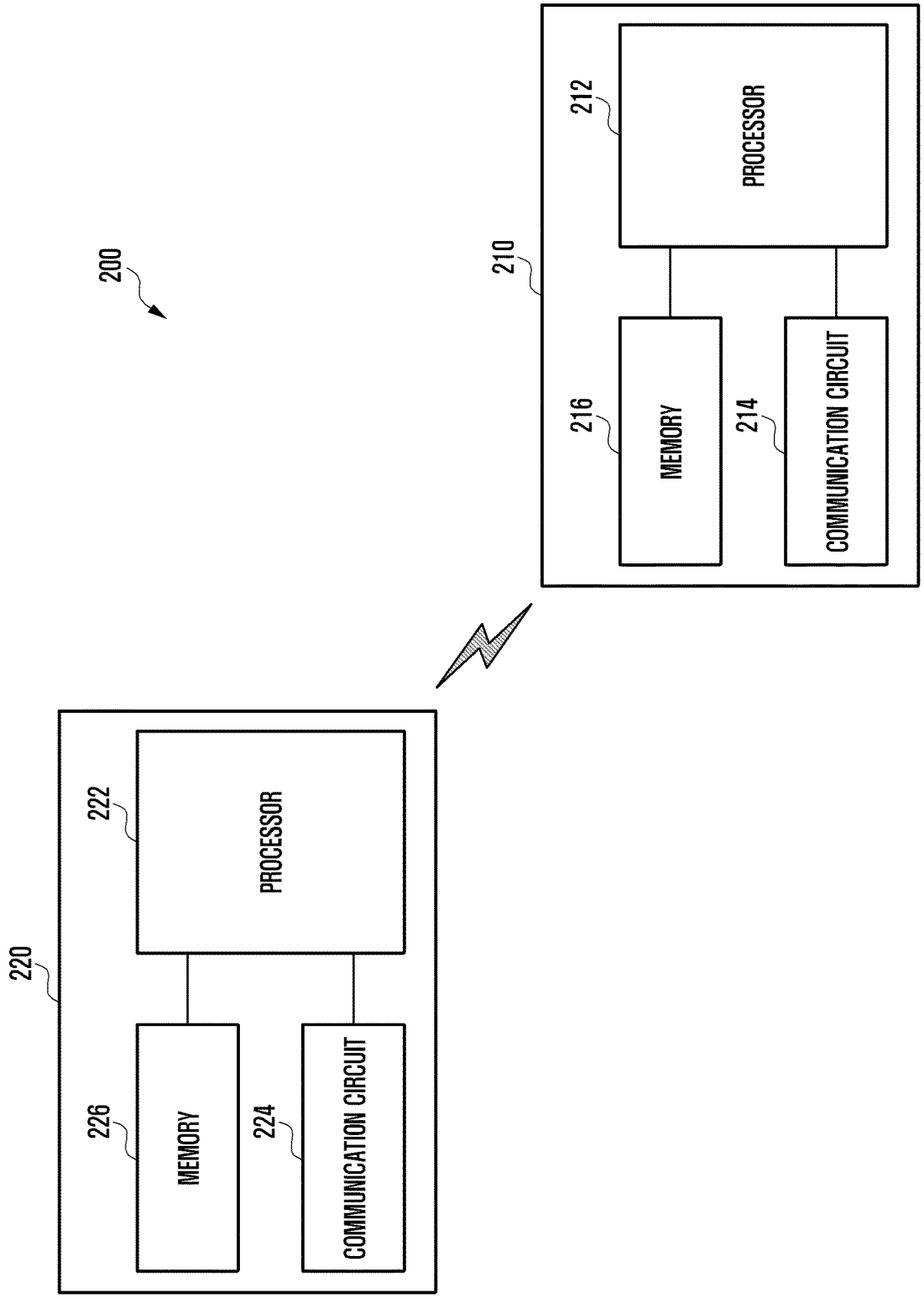
FIG. 2 is a block diagram illustrating an example configuration of a WLAN system according to various embodiments.

FIG. 2 is a block diagram illustrating an example configuration of a WLAN system 200 according to various embodiments. According to an embodiment, the WLAN system 200 may be a communication system which provides short-range wireless communication using a designated frequency band, and may also be called Wi-Fi.

According to various embodiments referring to FIG. 2, the WLAN system 200 may include an electronic device 210 and/or an external electronic device 220. According to an embodiment, the electronic device 210 may perform wireless communication with the external electronic device 220 using short-range wireless communication. According to an embodiment, the external electronic device 220 may function to a base station which provides wireless communication to at least one electronic device 210 positioned within a communication radius of the WLAN system 200. For example, the external electronic device 220 may include an access point (AP).

According to various embodiments, the electronic device 210 may include a processor (e.g., including processing circuitry) 212, a communication circuit 214, and/or a memory 216. According to an embodiment, the processor 212 may be substantially identical or similar to the processor 120 in FIG. 1, or may be included in the processor 120. The communication circuit 214 may be substantially identical or similar to the wireless communication module 192 in FIG. 1, or may be included in the wireless communication module 192. The memory 216 may be substantially identical or similar to the memory 130 in FIG. 1, or may be included in the memory 130.

According to various embodiments, the processor 212 may include various processing circuitry and control the wireless communication circuit 214 and/or the memory 216 operatively connected thereto.

According to various embodiments, the processor 212 may control the communication circuit 214 to establish communication with the external electronic device 220 through short-range wireless communication. According to an embodiment, the processor 212 may control the communication circuit 214 to periodically, through short-range wireless communication, identify whether the external electronic device 220 accessible by the electronic device 210 exists. When the external electronic device 220 accessible by the electronic device 210 is discovered, the processor 212 may control the communication circuit 214 to establish a communication link with the external electronic device 220. For example, when the communication circuit 214 supporting short-range wireless communication is active, the processor 212 may control the communication circuit 214 to periodically, through short-range wireless communication, identify whether the external electronic device 220 accessible by the electronic device 210 exists. According to an embodiment, when occurrence of an event related to connection of short-range wireless communication is sensed based on a user input and/or control information of an application program, the processor 212 may control the communication circuit 214 to identify, through short-range wireless communication, whether the external electronic device 220 accessible by the electronic device 210 exists. When the external electronic device 220 accessible by the electronic device 210 is discovered, the processor 212 may control the communication circuit 214 to establish a communication link with the external electronic device 220. According to an embodiment, when the communication circuit 214 supporting short-range wireless communication is inactive, the processor 212 may control the communication circuit 214 to activate the communication circuit 214, based on occurrence of an event related to connection of short-range wireless communication. The processor 212 may identify, via the activated communication circuit 214, whether the external electronic device 220 accessible by the electronic device 210 exists. For example, the external electronic device 220 accessible by the electronic device 210 may include the external electronic device 220 for which the strength (e.g., received signal strength) of a signal received by the electronic device 210 exceeds a designated reference strength.

According to various embodiments, the processor 212 may identify state information related to fading of a subcarrier, based on a reference signal (RS) received from the external electronic device 220. For example, the state information related to fading may include a channel gain of a subcarrier caused by constructive interference or destructive interference generated by small scale fading. According to an embodiment, the processor 212 may periodically perform an OFDM demodulation (e.g., fast Fourier transform (FFT) calculation) of a reference signal received from the external electronic device 220, to perform a channel estimation. The processor 212 may obtain a channel gain of each of subcarriers included in an available frequency resource (e.g., about 160 MHz) of the WLAN system 200, based on a channel estimation result. For example, the channel gain may indicate the magnitude of a signal in a subcarrier. According to an embodiment, the reference signal may include a signal related to channel sounding. For example, the external electronic device 220 may periodically transmit a signal related to channel sounding for channel estimation. For example, the signal related to channel sounding may include a null data packet (NDP) including a long training field (LTF). According to an embodiment, the reference signal may include a signal (or frame) related to a probe request and/or a probe response, or a signal (or frame) related to an association request and/or an association response. For example, the reference signal may include a signal for configuration of a communication link by the external electronic device 220 and the electronic device 210.

According to various embodiments, the processor 212 may configure at least one preferred resource area, based on a channel gain of a subcarrier identified based on a reference signal. For example, the preferred resource area may indicate a resource group including at least one consecutive subcarrier (or resource area) in which constructive interference is determined to have occurred, among subcarriers (or resource areas) included in an available frequency resource. According to an embodiment, the processor 212 may determine that constructive interference has occurred in at least one subcarrier, the channel gain of which satisfies a designated first condition, among subcarriers included in an available frequency resource. The processor 212 may configure at least one preferred resource area, based on at least one subcarrier in which constructive interference is determined to have occurred. For example, the processor 212 may configure at least one preferred resource area for each of at least one consecutive subcarrier among at least one subcarrier in which constructive interference is determined to have occurred. For example, a state of satisfying the designated first condition may include a state where the channel gain of a subcarrier exceeds a first reference gain. For example, the first reference gain may include a channel gain configured or defined to determine whether constructive interference has occurred in a subcarrier.

According to an embodiment, the processor 212 may configure at least one reference subcarrier, based on subcarriers having local peaks in an available frequency resource. The processor 212 may determine that constructive interference has occurred in at least one subcarrier having a channel gain difference from at least one reference subcarrier, the difference being included within a reference range. The processor 212 may configure at least one preferred resource area, based on at least one subcarrier in which constructive interference is determined to have occurred. For example, the reference subcarrier may include subcarriers having local peaks. For example, the reference subcarrier may include at least one subcarrier having a channel gain exceeding a second reference gain among subcarriers having local peaks. For example, the reference subcarrier may include a reference number of subcarriers sequentially from a subcarrier having the largest channel gain, based on the channel gains of subcarriers having local peaks. For example, the local peak may include peak values at which a channel gain fluctuation (or change rate) is reversed in an available frequency resource. For example, the second reference gain may include a channel gain configured or defined to select a reference subcarrier. For example, the second reference gain may include a channel gain greater than the first reference gain.

According to an embodiment, the processor 212 may configure (or select), as a preferred resource area, at least one resource area among multiple resource areas included in an available frequency resource. For example, a resource area (e.g., resource unit (RU)) may indicate a basic unit for resource allocation in the WLAN system 200. According to an embodiment, the processor 212 may configure (or select), as a preferred resource area, at least one resource area in which constructive interference is determined to have occurred, based on the channel gain of at least one subcarrier included in each resource area. For example, the processor 212 may determine that constructive interference has occurred in a resource area including subcarriers, the channel gain average of which satisfies a designated second condition. For example, a state of satisfying the designated second condition may include a state where the average of the channel gains of subcarriers exceeds a third reference gain. For example, the third reference gain may be a channel gain configured or defined to determine whether constructive interference has occurred in a resource area, and may be identical to or different from the first reference gain. For example, the average of channel gains may include the average of channel gains of all subcarriers included in a resource area. For example, the average of channel gains may include the average of channel gains exceeding a fourth reference gain among channel gains of subcarriers included in a resource area. As another example, the average of channel gains may include the average of the channel gains of a reference number of subcarriers sequentially from a subcarrier having the largest channel gain, based on the channel gains of subcarriers included in a resource area. For example, the fourth reference gain may include a channel gain configured or defined to select at least one subcarrier to be used to calculate the average of channel gains. For example, the fourth reference gain may include a channel gain identical to or smaller than the third reference gain.

According to various embodiments, the processor 212 may control the communication circuit 214 to transmit information related to at least one preferred resource area to the external electronic device 220. According to an embodiment, the processor 212 may control the communication circuit 214 to transmit information related to a preferred resource area to the external electronic device 220 periodically or when the occurrence of an event related to a request of the preferred resource area is sensed. For example, the event related to the request of the preferred resource area may be generated by a request of the external electronic device 220 and/or an application program executed in the electronic device 210. For example, the information related to a preferred resource area may include an index of at least one subcarrier included in the preferred resource area, or an index of at least one resource area selected as the preferred resource area. For example, the index of at least one subcarrier included in a preferred resource area may include an index of the start subcarrier and an index of the last subcarrier among at least one subcarrier included in the preferred resource area. For example, the information related to a preferred resource area may include, in a case where multiple preferred resource areas area configured, an index of at least one subcarrier included in each of the preferred resource areas, or an index of at least one resource area selected as each of the preferred resource areas. For example, the information related to a preferred resource area may be included in a beamforming report (e.g., a compressed beamforming report in Wi-Fi 6 standard) transmitted to the external electronic device 220, a signal field (SIG)

(e.g., extreme high throughput (EHT)-SIG in Wi-Fi 6 standard) of a physical (PHY) header, or a media access control (MAC) header.

According to various embodiments, the processor 212 may be allocated a resource for wireless communication by the external electronic device 220, based on information related to a preferred resource area. The processor 212 may control the communication circuit 214 to transmit and/or receive a signal and/or data with the external electronic device 220, based on a resource (e.g., a frequency resource) allocated by the external electronic device 220. According to an embodiment, the resource allocated by the external electronic device 220 may include a resource for transmission of, by the electronic device 210, a signal and/or data to the external electronic device 220, and a resource for reception of, by the electronic device 210, a signal and/or data from the external electronic device 220. For example, the resource for transmission of, by the electronic device 210, a signal and/or data to the external electronic device 220 may be allocated by the external electronic device 220, based on the signal and/or the data to be transmitted by the electronic device 210 to the external electronic device 220. For example, the resource for reception of, by the electronic device 210, a signal and/or data from the external electronic device 220 may be allocated by the external electronic device 210, based on the signal and/or the data to be transmitted by the external electronic device 220 to the electronic device 210.

According to various embodiments, the communication circuit 214 may transmit and/or receive a signal and/or data with an external device (e.g., the external electronic device 220) through short-range wireless communication (e.g., wireless fidelity (WiFi)). According to an embodiment, the communication circuit 214 may perform a network search for identification of whether the external electronic device 220 accessible by the electronic device 210 exists. The communication circuit 214 may establish a communication link with the external electronic device 220 discovered through a network search, based on a control of the processor 212. According to an embodiment, the communication circuit 214 may support short-range wireless communication based on an orthogonal frequency division multiple access (OFDMA) transmission scheme. For example, the communication circuit 214 may include a radio frequency integrated circuit (RFIC) and a radio frequency front end (RFFE) for communication with an external electronic device.

According to various embodiments, the memory 216 may store various data used by at least one element (e.g., the processor 212 or the communication circuit 214) of the electronic device 210. According to an embodiment, the memory 216 may store various instructions executable via the processor 212. According to an embodiment, the data may include information relating to a resource (e.g., a frequency resource) allocated by the external electronic device 220.

According to various embodiments, the external electronic device 220 may include a processor (e.g., including processing circuitry) 222, a communication circuit 224, and/or a memory 226. According to an embodiment, the processor 222 may be substantially identical or similar to the processor 120 in FIG. 1, or may be included in the processor 120. The communication circuit 224 may be substantially identical or similar to the wireless communication module 192 in FIG. 1, or may be included in the wireless communication module 192. The memory 226 may be substantially identical or similar to the memory 130 in FIG. 1, or may be included in the memory 130.

According to various embodiments, the processor 222 may include various processing circuitry and control the wireless communication circuit 224 and/or the memory 226 operatively connected thereto.

According to various embodiments, the processor 222 may control the communication circuit 224 to establish communication with the electronic device 210 through short-range wireless communication. According to an embodiment, when a connection request message is received via the communication circuit 224, the processor 222 may control the communication circuit 224 to establish a communication link with the electronic device 210 having transmitted the connection request message.

According to various embodiments, the processor 222 may control the communication circuit 224 to periodically transmit a reference signal (RS). According to an embodiment, the processor 222 may control the communication circuit 224 to periodically transmit a reference signal to at least one electronic device 210 positioned within a communication radius of the external electronic device 220. For example, the communication circuit 224 may transmit a reference signal through a communication link with the electronic device 210. For example, the reference signal may include a signal for configuration of a communication link with the electronic device 210.

According to various embodiments, the processor 222 may allocate a resource to at least one electronic device 210. According to an embodiment, when the occurrence of an event related to resource allocation is sensed, the processor 222 may allocate wireless resources (e.g., time and/or frequency resources) to the electronic devices 210 sequentially from the electronic device 210 having a high resource allocation priority. For example, the resource allocation priority of the electronic device 210 may be configured based on a resource allocation request time point, a resource allocation time point, and a buffer status report (BSR) and/or a buffer status report poll (BSRP) of the electronic device 210. For example, when it is determined that resources are required to be allocated to multiple devices (e.g., the electronic devices 210), the processor 222 may control the communication circuit 224 to transmit BSRPs to the multiple devices to determine resource allocation priorities. The processor 222 may receive BSRs from the multiple devices in response to the BRSPs, and determine resource allocation priorities. For example, the BSR may include information related to the amount of packets included in the memory 216 (e.g., queue) of the electronic device 210. For example, the event related to resource allocation may be generated when a signal and/or data to be transmitted to a particular electronic device from the external electronic device 220 is generated, or when a resource allocation request message is received from a particular electronic device.

According to an embodiment, the processor 222 may allocate a wireless resource to the electronic device 210, based on information related to a preferred resource area of the electronic device 210 selected for resource allocation. For example, the information related to a preferred resource area of the electronic device 210 may be received based on a periodically transmitted reference signal. For example, the processor 222 may allocate at least one subcarrier included in a preferred resource area of the electronic device 210 to the electronic device 210, based on a service quality (e.g., quality of service (QoS)) required in the electronic device 210 selected for resource allocation. For example, a size (e.g., the number of subcarriers) of a resource allocated to the electronic device 210 may be configured based on at least one of a service quality required in the electronic device 210, an amount of a signal and/or data to be transmitted by the external electronic device 220 to the electronic device 210, and/or an amount of a resource required in the electronic device 210. For example, the amount of a resource required in the electronic device 210 may be obtained based on the BSR and/or BSRP of the electronic device 210.

According to an embodiment, the processor 222 may allocate resources to multiple electronic devices, based on information related to preferred resource areas of the multiple electronic devices. For example, the processor 220 may allocate a resource to each electronic device, based on information related to a preferred resource area, received from each electronic device. For example, the processor 222 may, based on at least one of a service quality (e.g., QoS) of each of multiple electronic devices, an amount of a signal and/or data to be transmitted to each of the multiple electronic devices, and/or an amount of a resource required in each of the multiple electronic devices, allocate at least one subcarrier included in a preferred resource area of each electronic device to each electronic device.

According to various embodiments, the processor 222 may control the communication circuit 224 to transmit resource allocation information for the electronic device 210 to the electronic device 210. The processor 222 may control the communication circuit 224 to transmit and/or receive a signal and/or data with the electronic device 210, based on a wireless resource allocated to the electronic device 210.

According to various embodiments, the communication circuit 224 may transmit and/or receive a signal and/or data with an external electronic device (e.g., the electronic device 210) through short-range wireless communication (e.g., WiFi). According to an embodiment, the communication circuit 224 may support short-range wireless communication based on an OFDMA transmission scheme. For example, the communication circuit 224 may include an RFIC and an RFFE for communication with an external electronic device.

According to various embodiments, the memory 226 may store various data used by at least one element (e.g., the processor 222 or the communication circuit 224) of the external electronic device 220. According to an embodiment, the memory 226 may store various instructions executable via the processor 222. According to an embodiment, the data may include information relating to resources (e.g., frequency resources) allocated to multiple electronic devices.

According to various example embodiments, an electronic device (e.g., the electronic device 101 in FIG. 1 or the electronic device 210 in FIG. 2) may include: a memory (e.g., the memory 130 in FIG. 1 or the memory 216 in FIG. 2), a communication circuit (e.g., the wireless communication module 192 in FIG. 1 or the communication circuit 214 in FIG. 2), and a processor (e.g., the processor 120 in FIG. 1 or the processor 212 in FIG. 2) operatively connected to the memory and the communication circuit, wherein the processor is configured to: receive a reference signal from an external electronic device (e.g., the external electronic device 220 in FIG. 2) via the communication circuit, identify channel gains of multiple subcarriers included in a frequency resource through a channel estimation based on the reference signal, identify, based on the channel gains of the subcarriers, subcarriers in which constructive interference is determined to have occurred, configure multiple resource groups (e.g., the preferred resource areas 710 and 720 in FIG. 7B) for at least one consecutive subcarrier among the identified subcarriers, and transmit information related to the multiple resource groups to the external electronic device via the communication circuit.

According to various example embodiments, the multiple resource groups may include at least one subcarrier which is not consecutive to at least one subcarrier included in a different resource group.

According to various example embodiments, the information related to the multiple resource groups may include an index of a subcarrier at a start point among at least one subcarrier included in each resource group, and an index of a subcarrier at a last point.

According to various example embodiments, the processor may be configured to determine that the constructive interference has occurred in the subcarriers, the channel gains of which satisfy a designated first condition, among the multiple subcarriers.

According to various example embodiments, the processor may be configured to: identify subcarriers having local peaks among the multiple subcarriers, and detect, based on channel gains of the subcarriers having the local peaks, the subcarriers in which the constructive interference is determined to have occurred.

According to various example embodiments, the processor may be configured to: identify multiple resource areas configured in the frequency resource, and select, based on channel gains of subcarriers included in the resource areas, resource areas in which the constructive interference is determined to have occurred.

According to various example embodiments, the communication circuit may be configured to support short-range wireless communication based on an orthogonal frequency division multiple access (OFDMA) transmission scheme.

According to various example embodiments, information related to the at least one subcarrier may be included in a beamforming report, a signal field (SIG) of a physical (PHY) header, or a media access control (MAC) header.

According to various example embodiments, an electronic device (e.g., the electronic device 101 in FIG. 1 or the external electronic device 220 in FIG. 2) may include: a memory (e.g., the memory 130 in FIG. 1 or the memory 226 in FIG. 2), a communication circuit (e.g., the wireless communication module 192 in FIG. 1 or the communication circuit 224 in FIG. 2), and a processor (e.g., the processor 120 in FIG. 1 or the processor 222 in FIG. 2) operatively connected to the memory and the communication circuit, wherein the processor is configured to: transmit a reference signal via the communication circuit, receive information related to fading from multiple external electronic devices (e.g., the electronic device 210 in FIG. 2), based on the reference signal, select an electronic device to which a wireless resource is to be allocated among the multiple external electronic devices, and allocate a wireless resource to the external electronic device, based on the information related to fading received from the external electronic device.

According to various example embodiments, the information related to fading may include information related to multiple resource groups including at least one subcarrier in which constructive interference is determined to have occurred in a frequency resource by the external electronic device, each of the multiple resource groups may include at least one consecutive subcarrier in which the constructive interference is determined to have occurred by the external electronic device, and the multiple resource groups may include at least one subcarrier which is not consecutive to at least one subcarrier included in a different resource group.

According to various example embodiments, the information related to fading may include an index of a subcarrier at a start point among at least one subcarrier included in each resource group, and an index of a subcarrier at a last point.

According to various example embodiments, the communication circuit may be configured to support short-range wireless communication based on an orthogonal frequency division multiple access (OFDMA) transmission scheme.

Figure 3:
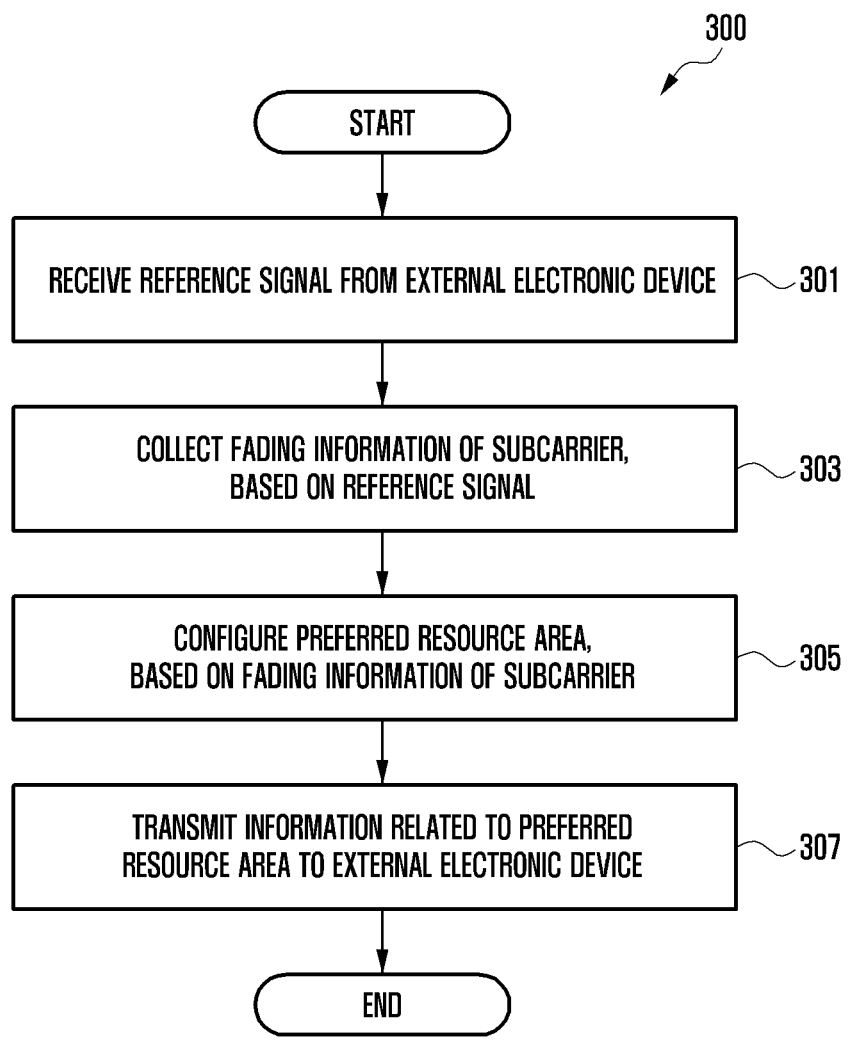
FIG. 3 is a flowchart illustrating example transmission of information related to a preferred resource area by an electronic device according to various embodiments.
Figure 4:
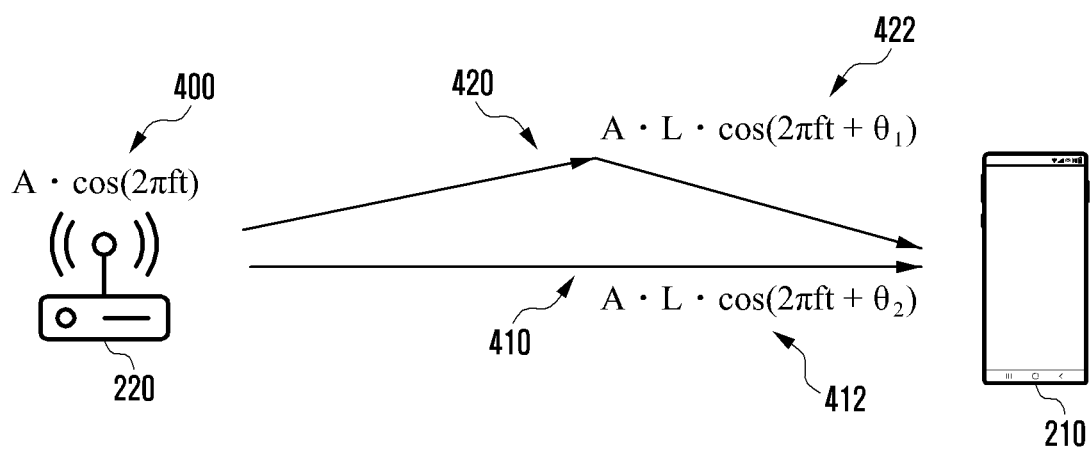
FIG. 4 is a diagram illustrating an example of a WLAN system in which fading occurs according to various embodiments.
Figure 5A:
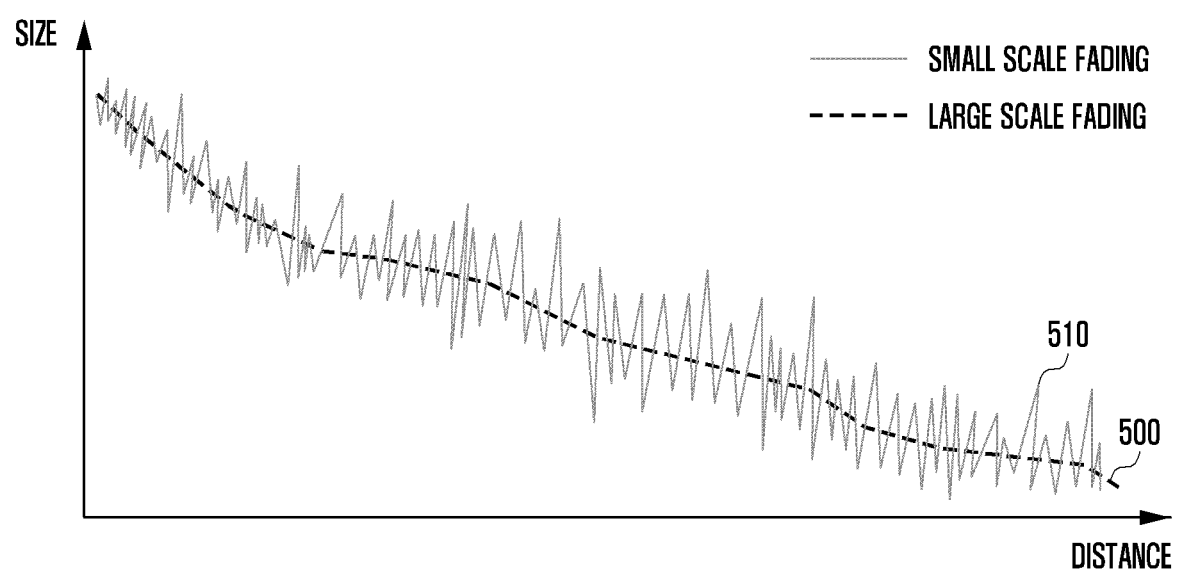
FIG. 5A and FIG. 5B are graphs illustrating example amplitude fluctuations caused by fading in a WLAN system according to various embodiments.
Figure 5B:
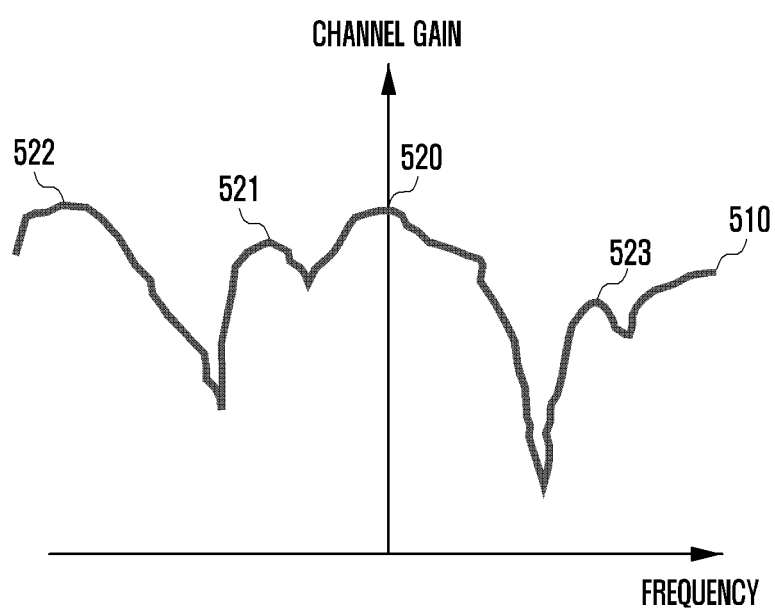

FIG. 3 is a flowchart 300 illustrating example transmission of information related to a preferred resource area by an electronic device according to various embodiments. In an example below, operations may be sequentially performed, but the operations are not required to be necessarily sequentially performed. For example, the sequences of operations may be changed, and at least two operations may be performed in parallel. For example, an electronic device in FIG. 3 may be the electronic device 101 in FIG. 1 or the electronic device 210 in FIG. 2. For example, at least a part of FIG. 3 may refer to FIG. 4, FIG. 5A, or FIG. 5B. FIG. 4 is a diagram illustrating an example of a WLAN system in which fading occurs according to various embodiments. FIG. 5A and FIG. 5B are graphs illustrating example amplitude fluctuations caused by fading in a WLAN system according to various embodiments.

According to various embodiments referring to FIG. 3, an electronic device (e.g., the processor 120 in FIG. 1 or the processor 212 in FIG. 2) may, in operation 301, receive a reference signal from the external electronic device 220. According to an embodiment, the processor 212 may control the communication circuit 214 to establish a communication link with the external electronic device 220 through short-range wireless communication. The processor 212 may receive a reference signal through a communication link established with the external electronic device 220. For example, the reference signal may include a signal related to channel sounding. For example, the signal related to channel sounding may include a null data packet (NDP) including a long training field (LTF). For example, the reference signal may include a signal (or frame) related to a probe request and/or a probe response, or a signal (or frame) related to an association request and/or an association response.

According to various embodiments, the electronic device (e.g., the processor 120 or 212) may, in operation 303, collect information related to fading of a subcarrier, based on the reference signal received from the external electronic device 220. According to an embodiment, the electronic device 210 may, as illustrated in FIG. 4, receive overlapped signals (e.g., signals 412 and 422) through multiple paths (e.g., paths 410 and 420) from a signal 400 transmitted by the external electronic device 220, according to reflection, diffraction, and/or scattering of, by an object such as a building, the signal 400 transmitted by the external electronic device 220. In relation to a signal received by the electronic device 210, signals having different phases (e.g., $\theta_1$ or $\theta_2$) overlap with each other through different paths (e.g., paths 410 or 420), and thus, based on the phase difference between the signals, constructive interference in which the amplitude of the signal increases may occur, or destructive interference in which the amplitude of the signal decreases may occur. For example, destructive interference may occur when signals received through multiple paths (e.g., paths 410 and 420) have opposite phases (e.g., the difference of about 180°). According to an embodiment, in relation to a signal received by the electronic device 210, as illustrated in FIG. 5A, based on the distance from the external electronic device 220, large scale fading 500 in which the amplitude of the reception signal decreases, and small scale fading 510 in which the amplitude of the reception signal changes due to multiple paths may occur. For example, small scale fading may include a state where the amplitude fluctuation of a signal occurs due to constructive interference or destructive interference caused by multiple paths (e.g., paths 410 and 420) as illustrated in FIG. 4.

According to an embodiment, the processor 212 may detect a channel gain of a subcarrier through a channel estimation based on a reference signal received from the external electronic device 220. The processor 212 may detect at least one subcarrier in which constructive interference is determined to have occurred, based on the channel gain of a subcarrier in an available frequency resource of the WLAN system 200. For example, the processor 212 may determine that constructive interference has occurred in at least one subcarrier, the channel gain of which satisfies a designated first condition, among subcarriers included in an available frequency resource. For example, a state of satisfying the designated first condition may include a state where the channel gain of a subcarrier exceeds a first reference gain. For example, the first reference gain may include a channel gain configured or defined to determine whether constructive interference has occurred in a subcarrier.

For example, the processor 212 may configure at least one reference subcarrier, based on subcarriers (e.g., subcarriers 520, 521, 522, and/or 523 illustrated in FIG. 5B) having local peaks in an available frequency resource. The processor 212 may determine that constructive interference has occurred in at least one subcarrier having a channel gain difference from a reference subcarrier, the difference being included within a reference range. For example, the reference subcarrier may include subcarriers (e.g., subcarriers 520, 521, 522, and/or 523) having local peaks. As another example, the reference subcarrier may include at least one subcarrier (e.g., subcarriers 520, 521, and 522) having a channel gain exceeding a second reference gain among subcarriers (e.g., subcarriers 520, 521, 522, and/or 523) having local peaks. As another example, the reference subcarrier may include a reference number of subcarriers sequentially from a subcarrier having the largest channel gain, based on the channel gains of subcarriers having local peaks. For example, the second reference gain may include a channel gain configured or defined to select a reference subcarrier. For example, the second reference gain may include a channel gain greater than the first reference gain.

For example, the processor 212 may detect at least one resource area in which constructive interference is determined to have occurred, based on the channel gains of subcarriers included in each of multiple resource areas included in an available frequency resource.

According to various embodiments, the electronic device (e.g., the processor 120 or 212) may, in operation 305, configure at least one preferred resource area of the electronic device 210, based on small scale fading information of a subcarrier. According to an embodiment, the processor 212 may configure at least one preferred resource area, based on at least one subcarrier in which constructive interference is determined to have occurred. For example, the preferred resource area may include at least one consecutive subcarrier (or resource area) in which constructive interference is determined to have occurred, among subcarriers (or resource areas) included in an available frequency resource. For example, the processor 212 may configure at least one preferred resource area for each of at least one consecutive subcarrier (or resource area) among at least one subcarrier (or resource area) in which constructive interference is determined to have occurred.

According to various embodiments, the electronic device (e.g., the processor 120 or 212) may, in operation 307, transmit information related to at least one preferred resource area of the electronic device 210 to the external electronic device 220. According to an embodiment, the processor 212 may control the communication circuit 214 to transmit information related to at least one preferred resource area to the external electronic device 220. For example, the information related to a preferred resource area may include, as shown in Table 1, an index of at least one subcarrier included in the preferred resource area (e.g., a resource group), or an index of at least one resource area.

TABLE 1

SNR in stream 1 for preferred RU 1:
SNR, sub-carrier staring and end indices
SNR in stream 1 for preferred RU 2:
SNR, sub-carrier staring and end indices
SNR in stream 1 for preferred RU 3:
SNR, sub-carrier staring and end indices
. . .

For example, the index of a subcarrier included in a preferred resource area may include, as shown in Table 1, an index of the start subcarrier and an index of the last subcarrier among at least one subcarrier included in the preferred resource area. According to an embodiment, the processor 212 may transmit, to the external electronic device 220, an index of the start subcarrier and an index of the last subcarrier among subcarriers included in each of a first preferred resource area (e.g., preferred RU 1), a second preferred resource area (e.g., preferred RU 2), and a third preferred resource area (e.g., preferred RU 3), as shown in Table 1.

According to an embodiment, the electronic device 210 may transmit, to the external electronic device 220, information related to at least one preferred resource area of the electronic device 210 in addition to a channel quality indication (CQI) and channel status information (CSI) in response to a reference signal (e.g., a signal related to channel sounding). For example, the information related to a preferred resource area may be included in a beamforming report transmitted to the external electronic device 220, a signal field (SIG) of a physical (PHY) header, or a media access control (MAC) header.

For example, when information related to a preferred resource area is transmitted through a beamforming report, the electronic device 210 may transmit, to the external electronic device 220, information on an average signal to noise ratio (SNR) of all resource areas (RUs) for a spatial stream, and information related to each preferred resource area. For example, the information related to a preferred resource area may include an index of the start subcarrier of the preferred resource area, an index of the last subcarrier, and SNR information.

According to various embodiments, the electronic device 210 may transmit and/or receive a signal and/or data with the external electronic device 220, based on wireless communication allocated by the external electronic device 220, based on information related to a preferred resource area.

Figure 6:
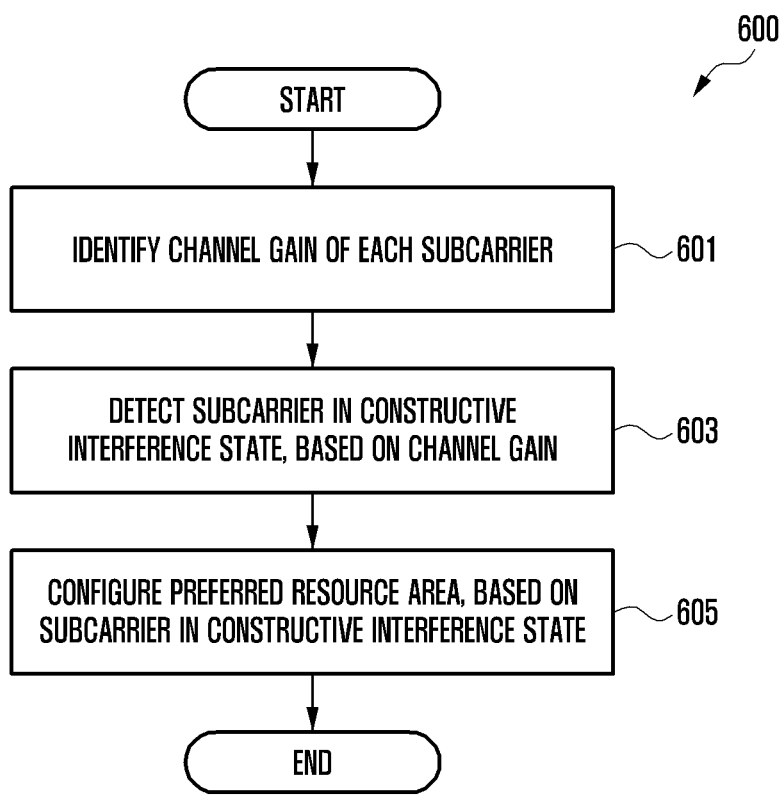
FIG. 6 is a flowchart illustrating an example operation of configuring a preferred resource area by an electronic device according to various embodiments.
Figure 7A:
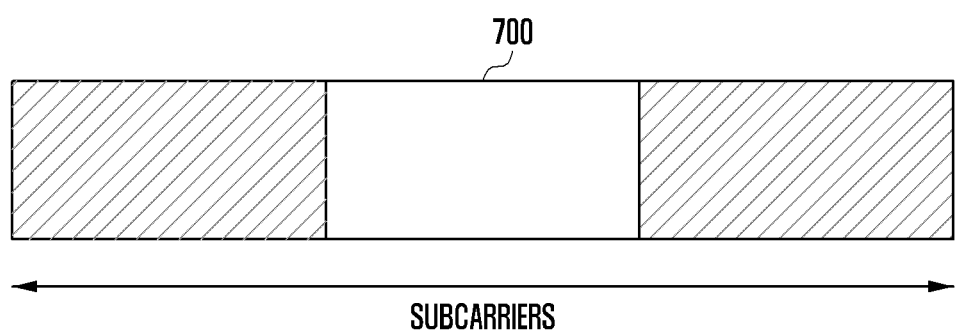
FIG. 7A and FIG. 7B are diagrams illustrating examples of a preferred resource area configured by an electronic device according to various embodiments.
Figure 7B:
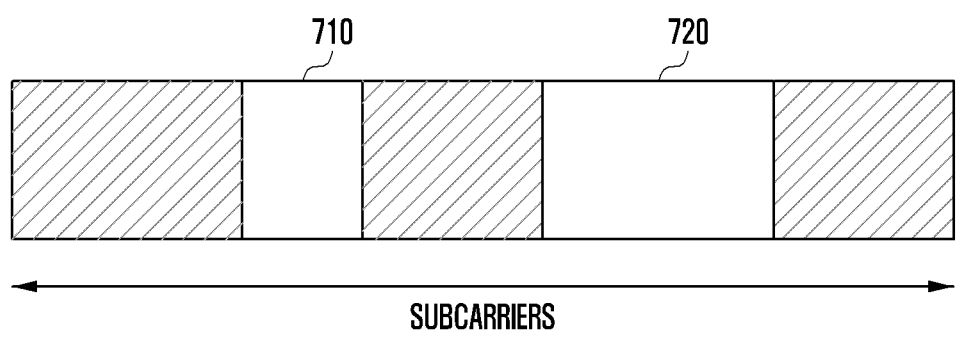

FIG. 6 is a flowchart 600 illustrating an example operation of configuring a preferred resource area by an electronic device according to various embodiments. According to an embodiment, the operations in FIG. 6 described below may be detailed sub-operations of operations 303 to 305 in FIG. 3. In an embodiment below, operations may be sequentially performed, but the operations are not required to be necessarily sequentially performed. For example, the sequences of operations may be changed, and at least two operations may be performed in parallel. For example, an electronic device in FIG. 6 may be the electronic device 101 in FIG. 1 or the electronic device 210 in FIG. 2. For example, at least a part of FIG. 6 may refer to FIG. 7A or FIG. 7B. FIG. 7A and FIG. 7B are examples of a preferred resource area configured by an electronic device according to various embodiments.

According to various embodiments referring to FIG. 6, when a reference signal is received from the external electronic device 220 with which a communication link is established (e.g., operation 301 in FIG. 3), an electronic device (e.g., the processor 120 in FIG. 1 or the processor 212 in FIG. 2) may, in operation 601, identify a channel gain of each of subcarriers included in an available frequency resource of the WLAN system 200, based on the reference signal received from the external electronic device 220. According to an embodiment, the processor 212 may perform an OFDM demodulation (e.g., FFT calculation) of a reference signal received from the external electronic device 220, and perform a channel estimation. The processor 212 may identify a channel gain of each of subcarriers included in an available frequency resource of the WLAN system 200, based on a channel estimation result. For example, the processor 212 may recognize a wireless resource (e.g., a frequency resource and/or time resource) on which the external electronic device 220 transmits a reference signal, based on control information received from the external electronic device 220 with which a communication link is established. The processor 212 may receive a reference signal from the external electronic device 220, based on a wireless resource on which the external electronic device 220 transmits the reference signal. For example, the reference signal may include a signal related to channel sounding.

According to various embodiments, the electronic device (e.g., the processor 120 or 212) may, in operation 603, detect at least one subcarrier determined to be in a constructive interference state, based on the channel gain of each subcarrier. According to an embodiment, the processor 212 may determine that constructive interference has occurred in at least one subcarrier, the channel gain of which satisfies a designated first condition, among subcarriers included in an available frequency resource of the WLAN system 200. For example, a state of satisfying the designated first condition may include a state where the channel gain of a subcarrier exceeds a first reference gain. For example, the first reference gain may include a channel gain configured or defined to determine whether constructive interference has occurred in a subcarrier.

According to various embodiments, the electronic device (e.g., the processor 120 or 212) may, in operation 605, configure at least one preferred resource area of the electronic device 210, based on the at least one subcarrier determined to be in a constructive interference state. According to an embodiment, the processor 212 may configure, as a first preferred resource area 700 of the electronic device 210, at least one consecutive subcarrier in which constructive interference is determined to have occurred, as shown in FIG. 7A. According to an embodiment, as shown in FIG. 7B, the processor 212 may configure, as a second preferred resource area 710, at least one consecutive subcarrier in which constructive interference is determined to have occurred, and configure, as a third preferred resource area 720, at least another consecutive subcarrier. For example, at least one subcarrier included in the second preferred resource area 710 and at least one subcarrier included in the third preferred resource area 720 may be discontinuous.

Figure 8:
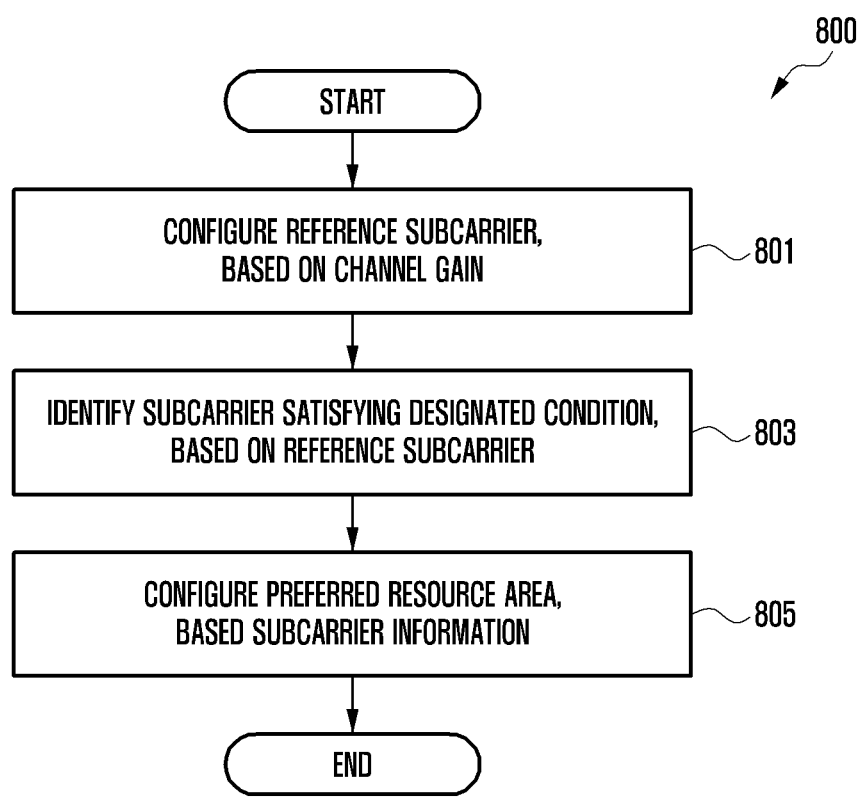
FIG. 8 is a flowchart illustrating an example operation of configuring a preferred resource area by an electronic device according to various embodiments.

FIG. 8 is a flowchart illustrating an example operation of configuring a preferred resource area by an electronic device according to various embodiments. According to an embodiment, the operations in FIG. 8 described below may be detailed sub-operations of operation 305 in FIG. 3. In an embodiment below, operations may be sequentially performed, but the operations are not required to be necessarily sequentially performed. For example, the sequences of operations may be changed, and at least two operations may be performed in parallel. For example, an electronic device in FIG. 8 may be the electronic device 101 in FIG. 1 or the electronic device 210 in FIG. 2.

According to various embodiments referring to FIG. 8, when a channel gain of each of subcarriers is identified based on a reference signal received from the external electronic device 220 with which a communication link is established (e.g., operation 303 in FIG. 3), an electronic device (e.g., the processor 120 in FIG. 1 or the processor 212 in FIG. 2) may, in operation 801, configure at least one reference subcarrier, based on the channel gain of each of subcarriers included in an available frequency resource of the WLAN system 200. For example, the at least one reference subcarrier may include subcarriers (e.g., subcarriers 520, 521, 522, and/or 523 illustrated in FIG. 5B) having local peaks in an available frequency resource of the WLAN system 200. For example, the at least one reference subcarrier may include at least one subcarrier (e.g., subcarriers 520, 521, and 522) having a channel gain exceeding a second reference gain among subcarriers (e.g., subcarriers 520, 521, 522, and/or 523) having local peaks. For example, the second reference gain may include a channel gain configured or defined to select a reference subcarrier. For example, the at least one reference subcarrier may include a reference number of subcarriers sequentially from a subcarrier having the largest channel gain, based on the channel gains of subcarriers (e.g., subcarriers 520, 521, 522, and/or 523) having local peaks.

According to various embodiments, the electronic device (e.g., the processor 120 or 212) may, in operation 803, identify at least one subcarrier satisfying a designated condition, based on the reference subcarrier. According to an embodiment, the processor 212 may determine that constructive interference has occurred in at least one consecutive subcarrier having a channel gain difference from the reference subcarrier, the difference being included within a reference range, among subcarriers included in an available frequency resource of the WLAN system 200.

According to various embodiments, the electronic device (e.g., the processor 120 or 212) may, in operation 805, configure at least one preferred resource area of the electronic device 210, based on the at least one subcarrier determined to be in a constructive interference state. According to an embodiment, the processor 212 may configure at least one preferred resource area including the reference subcarrier, and at least one subcarrier satisfying a designated condition, based on the reference subcarrier.

According to various embodiments, when there is no subcarrier having a channel gain exceeding a second reference gain among subcarriers (e.g., subcarriers 520, 521, 522, and/or 523) having local peaks, the electronic device (e.g., the processor 120 or 212) may determine that the preferred resource area of the electronic device 210 does not exist. According to an embodiment, when it is determined that the preferred resource area of the electronic device 210 does not exist, the processor 212 may control the communication circuit 214 to transmit non-existence of the preferred resource area to the external electronic device 220.

According to various embodiments, when there is no subcarrier having a channel gain exceeding a second reference gain among subcarriers (e.g., subcarriers 520, 521, 522, and/or 523) having local peaks, the electronic device (e.g., the processor 120 or 212) may select a reference subcarrier in a different selection scheme. For example, the different selection scheme may include a scheme of selecting subcarriers having local peaks as reference subcarriers and/or a scheme of selecting a reference number of subcarriers, based on the channel gains of subcarriers having local peaks.

Figure 9A:
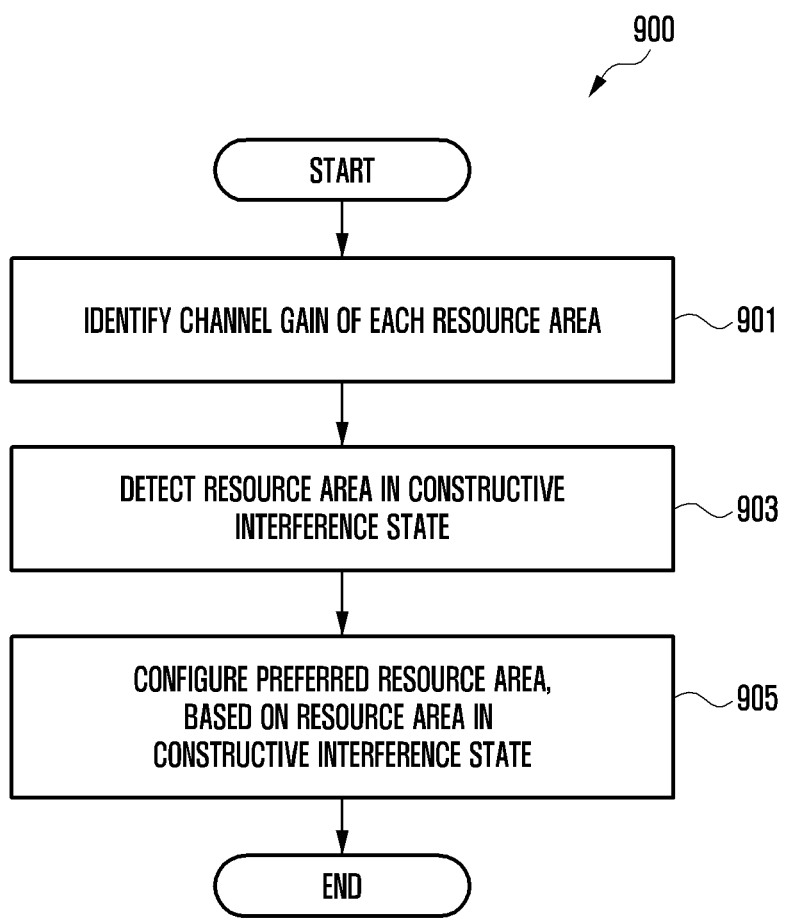
FIG. 9A is a flowchart illustrating an example operation of configuring a preferred resource area by an electronic device according to various embodiments.
Figure 9B:
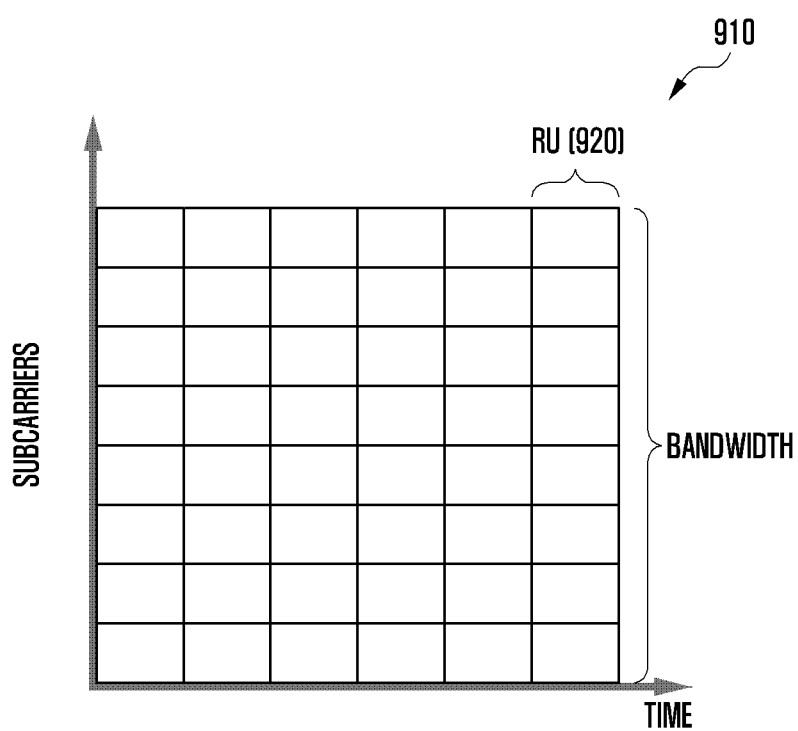
FIG. 9B is a diagram illustrating a time-frequency resource structure in a WLAN system according to various embodiments.
Figure 9C:
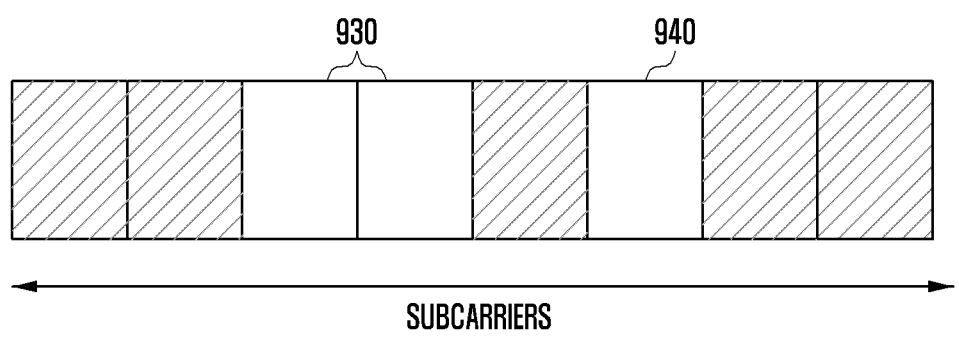
FIG. 9C is a diagram illustrating an example of a preferred resource area configured by an electronic device according to various embodiments.

FIG. 9A is a flowchart illustrating an example of operation of configuring a preferred resource area by an electronic device according to various embodiments. According to an embodiment, the operations in FIG. 9 described below may be detailed sub-operations of operations 303 to 305 in FIG. 3. In an embodiment below, operations may be sequentially performed, but the operations are not required to be necessarily sequentially performed. For example, the sequences of operations may be changed, and at least two operations may be performed in parallel. For example, an electronic device in FIG. 9A may be the electronic device 101 in FIG. 1 or the electronic device 210 in FIG. 2. For example, at least a part of FIG. 9A may refer to FIG. 9B and/or FIG. 9C. FIG. 9B is a diagram illustrating an example time-frequency resource structure in a WLAN system according to various embodiments. FIG. 9C is a diagram illustrating an example of a preferred resource area configured by an electronic device according to various embodiments.

According to various embodiments referring to FIG. 9A, when a reference signal is received from the external electronic device 220 with which a communication link is established (e.g., operation 301 in FIG. 3), an electronic device (e.g., the processor 120 in FIG. 1 or the processor 212 in FIG. 2) may, in operation 901, identify a channel gain of each of resource areas included in an available frequency resource of the WLAN system 200. According to an embodiment, the WLAN system 200 may transmit and/or receive a signal and/or data using a time-frequency wireless resource 910 as shown in FIG. 9B, based on an OFDMA scheme. For example, the transverse axis of the wireless resource 910 may indicate a time resource (e.g., OFDM symbol), and the longitudinal axis may indicate a frequency resource (e.g., a subcarrier). For example, a resource area 920 corresponds to a basic structure for resource allocation in a time-frequency resource structure, and may include at least one OFDM symbol and at least one subcarrier.

According to various embodiments, the electronic device (e.g., the processor 120 or 212) may, in operation 903, detect at least one resource area which is in a constructive interference state among the resource areas included in the available frequency resource. According to an embodiment, the processor 212 may determine that constructive interference has occurred in a resource area having subcarriers, the average channel gain of which satisfies a designated second condition, among resource areas included in an available frequency resource of the WLAN system 200. For example, a state of satisfying the designated second condition may include a state where the average of the channel gains of subcarriers exceeds a third reference gain. For example, the average of channel gains may include the average of channel gains of all subcarriers included in a resource area. For example, the average of channel gains may include the average of channel gains exceeding a fourth reference gain among channel gains of subcarriers included in a resource area. As another example, the average of channel gains may include the average of the channel gains of a reference number of subcarriers sequentially from a subcarrier having the largest channel gain, based on the channel gains of subcarriers included in a resource area. For example, the third reference gain may include a channel gain configured or defined to determine whether constructive interference has occurred in a resource area. For example, the fourth reference gain may include a channel gain configured or defined to select at least one subcarrier to be used to calculate the average of channel gains. For example, the fourth reference gain may include a channel gain identical to or smaller than the third reference gain.

According to various embodiments, the electronic device (e.g., the processor 120 or 212) may, in operation 905, configure at least one preferred resource area of the electronic device 210, based on the at least one resource area determined to be in a constructive interference state. According to an embodiment, the processor 212 may configure at least one preferred resource area, based on continuity of at least one resource area determined to be in a constructive interference state. For example, as shown in FIG. 9C, the processor 212 may configure, as a first preferred resource area 930, at least one consecutive resource area in which constructive interference is determined to have occurred, and configure, as a second preferred resource area 940, at least another consecutive resource area.

According to various embodiments, the electronic device 210 may transmit, to the external electronic device 210, information related to at least one preferred resource area configured based on at least one resource area determined to be in a constructive interference state. For example, the information related to a preferred resource area may include, as shown in Table 2, an index of at least one resource area included in the in the preferred resource area.

TABLE 2

SNR in stream 1 for preferred RU 1:
SNR, resource unit staring and end indices
SNR in stream 1 for preferred RU 2:
SNR, resource unit staring and end indices
. . .

For example, the index of a resource area included in a preferred resource area may include, as shown in Table 2, an index of the start resource area and an index of the last resource area among at least one resource area included in the preferred resource area. According to an embodiment, the processor 212 may transmit, to the external electronic device 220, an index of the start resource area and an index of the last resource area among resource areas included in each of a first preferred resource area (e.g., preferred RU 1) (e.g., the first preferred resource area 930 in FIG. 9C) and a second preferred resource area (e.g., preferred RU 2) (e.g., the second preferred resource area 940 in FIG. 9C), as shown in Table 2.

Figure 10:
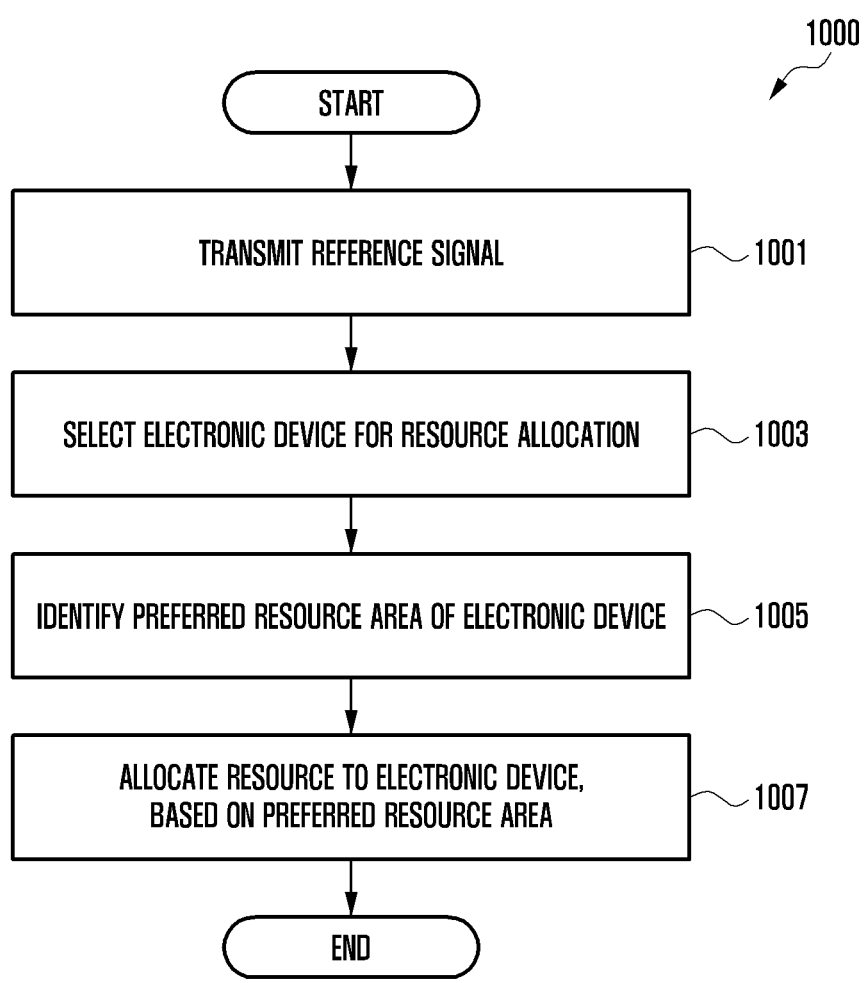
FIG. 10 is a flowchart illustrating example allocation of resources by an external electronic device according to various embodiments.
Figure 11:
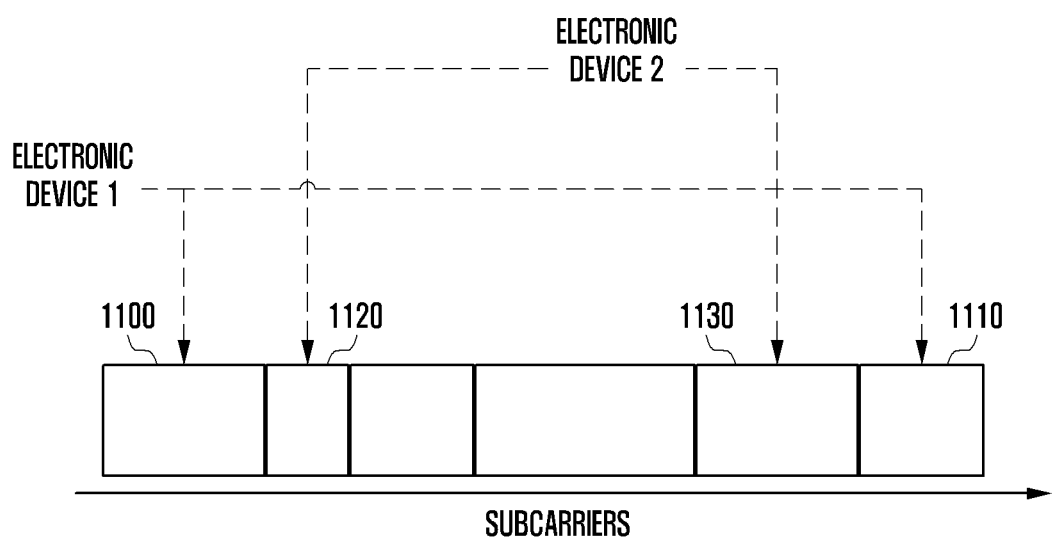
FIG. 11 is a diagram illustrating an example of resources allocated to electronic devices by an external electronic device according to various embodiments.

FIG. 10 is a flowchart illustrating example allocation of resources by an external electronic device according to various embodiments. In an embodiment below, operations may be sequentially performed, but the operations are not required to be necessarily sequentially performed. For example, the sequences of operations may be changed, and at least two operations may be performed in parallel. For example, an external electronic device in FIG. 10 may be the electronic device 101 in FIG. 1 or the external electronic device 220 in FIG. 2. For example, at least a part of FIG. 10 may refer to FIG. 11. FIG. 11 is a diagram illustrating an example of resources allocated to electronic devices by an external electronic device according to various embodiments.

According to various embodiments referring to FIG. 10, an external electronic device (e.g., the processor 120 in FIG. 1 or the processor 222 in FIG. 2) may, in operation 1001, transmit a reference signal to the electronic device 210. According to an embodiment, the processor 222 may control the communication circuit 224 to establish a communication link with the electronic device 210 positioned within a communication radius through short-range wireless communication. The processor 222 may control the communication circuit 224 to transmit a reference signal through a communication link established with electronic device 210. For example, the reference signal may include a signal related to channel sounding. For example, the signal related to channel sounding may include a null data packet (NDP) including a long training field (LTF). For example, the reference signal may include a signal (or frame) related to a probe request and/or a probe response, or a signal (or frame) related to an association request and/or an association response. For example, the reference signal may include a signal for configuration of a communication link by the external electronic device 220 and the electronic device 210.

According to various embodiments, the external electronic device (e.g., the processor 120 or 222) may, in operation 1003, select the electronic device 210 for resource allocation. According to an embodiment, when the occurrence of an event related to resource allocation is sensed, the processor 222 may select the electronic device 210 for resource allocation, based on resource allocation priorities of electronic devices having communication links configured with the external electronic device 220. For example, the resource allocation priority of the electronic device 210 may be configured based on a resource allocation request time point, a resource allocation time point, and a BSR and/or a BSRP of the electronic device 210. For example, the BSR may include information related to the amount of packets included in the memory 216 (e.g., queue) of the electronic device 210. For example, the event related to resource allocation may be generated when a signal and/or data to be transmitted to a particular electronic device from the external electronic device 220 is generated, or when a resource allocation request message is received from a particular electronic device.

According to various embodiments, the external electronic device (e.g., the processor 120 or 222) may, in operation 1005, identify a preferred resource area of the electronic device 210 for resource allocation. According to an embodiment, the preferred resource area of the electronic device 210 may be identified from information related to a preferred resource area of the electronic device 210, which is received from the electronic device 210 by the external electronic device 220. For example, the information related to a preferred resource area may include an index of a resource area or an index of a subcarrier configured as a preferred resource area of the electronic device 210. For example, the index of a subcarrier configured as a preferred resource area may include the index of the start subcarrier (or start resource area) of consecutive subcarriers (or resource areas) configured as the preferred resource area, and the index of the last subcarrier (or last resource area). For example, the information related to a preferred resource area may be included in a beamforming report received from the electronic device 210, a signal field (SIG) of a physical (PHY) header, or a media access control (MAC) header.

According to various embodiments, the external electronic device (e.g., the processor 120 or 222) may, in operation 1007, allocate a resource for wireless communication with the electronic device 210, based on the preferred resource area of the electronic device 210. According to an embodiment, the processor 222 may allocate at least one subcarrier included in a preferred resource area of the electronic device 210 to the electronic device 210, based on a service quality (e.g., QoS) required in the electronic device 210 selected for resource allocation. According to an embodiment, the processor 222 may allocate at least one consecutive and/or non-consecutive subcarrier to the electronic device 210, based on at least one preferred resource area of the electronic device 210. For example, the processor 222 may allocate at least one non-consecutive subcarrier 1100 and 1110 (e.g., multi RU assignment) to electronic device 1 (e.g., the electronic device 210), as illustrated in FIG. 11. For example, an amount (e.g., the number of subcarriers) of a resource allocated to the electronic device 210 may be configured based on at least one of a service quality required in the electronic device 210, an amount of a signal and/or data to be transmitted by the external electronic device 220 to the electronic device 210, and/or an amount of a resource required in the electronic device 210. For example, the amount of a resource required in the electronic device 210 may be obtained based on the BSR and/or BSRP of the electronic device 210.

According to various embodiments, the external electronic device 220 may perform wireless resource allocation to at least one electronic device until all available frequency resources of the WLAN system 200 are allocated. According to an embodiment, the processor 222 may repeatedly perform operation 1003 to operation 1007 of FIG. 10 until all available frequency resources of the WLAN system 200 are allocated. For example, the processor 222 may allocate a wireless resource to the electronic device 210 selected based on a resource allocation priority. When there is a resource which has not been allocated to an electronic device among available frequency resources of the WLAN system 200, the processor 222 may select, based on a resource allocation priority, an electronic device to which a wireless resource is additionally allocated. The processor 222 may allocate a wireless resource to the additionally selected electronic device, based on a preferred resource area of the electronic device. For example, the processor 222 may allocate at least one non-consecutive subcarrier 1100 and 1110 to electronic device 1 (e.g., the electronic device 210), and allocate at least one non-consecutive subcarrier 1120 and 1130 to electronic device 2, as illustrated in FIG. 11.

According to various embodiments, when preferred resource areas of multiple electronic devices at least partially overlap with each other, the external electronic device 220 may allocate an overlapped frequency resource to an electronic device, based on a resource allocation priority and/or channel state information. According to an embodiment, when preferred resource areas of multiple electronic devices at least partially overlap with each other, the processor 222 may allocate an overlapped frequency resource to an electronic device having a higher resource allocation priority. According to an embodiment, when preferred resource areas of multiple electronic devices at least partially overlap with each other, the processor 222 may identify channel state information of each of the multiple electronic devices with respect to an overlapped frequency resource. The processor 222 may allocate the overlapped frequency resource to an electronic device having a relatively good channel state among the multiple electronic devices. For example, the channel state information may include a received signal strength indicator (RSSI), reference signal received power (RSRP), a reference signal received quality (RSRQ), and/or a signal to noise ratio (SNR).

According to various embodiments, when a preferred resource area of the electronic device 210 for wireless resource allocation is not identified, the external electronic device 220 may allocate a wireless resource to the electronic device 210, based on a defined or configured resource allocation scheme. For example, the defined or configured resource allocation scheme may include a resource allocation scheme of sequentially allocating at least one subcarrier, based on the index of the subcarrier. As another example, a pre-defined resource allocation scheme may include a scheme of randomly allocating a resource among available frequency resources of the WLAN system 200.

According to various embodiments, the external electronic device 220 may allocate frequency resources (or resource areas) to the electronic device 210 such that the frequency resources are identical, at least partially overlap with each other, or are different from each other for each time resource (e.g., OFDM symbol).

According to various embodiments, when the size of a resource to be allocated to the electronic device 210 exceeds the size of a preferred resource area of the electronic device 210, the external electronic device 220 may allocate a resource corresponding to the preferred resource area of the electronic device 210 to the electronic device 210.

According to various embodiments, when the size of a resource to be allocated to the electronic device 210 exceeds the size of a preferred resource area of the electronic device 210, the external electronic device 220 may allocate a resource corresponding to the preferred resource area of the electronic device 210 and a resource not included in the preferred resource area to the electronic device 210.

According to various embodiments, the external electronic device 220 may transmit resource allocation information for the electronic device 210 to the electronic device 210. The external electronic device 220 may transmit and/or receive a signal and/or data with the electronic device 210, based on a wireless resource allocated to the electronic device 210.

According to various example embodiments, a method of operating an electronic device (e.g., the electronic device 101 in FIG. 1 or the electronic device 210 in FIG. 2) may include: receiving a reference signal from an external electronic device via short-range wireless communication, identifying channel gains of multiple subcarriers included in a frequency resource through a channel estimation based on the reference signal, identifying, based on the channel gains of the subcarriers, subcarriers in which constructive interference is determined to have occurred, configuring multiple resource groups each including at least one consecutive subcarrier among the identified subcarriers, and transmitting information related to the multiple resource groups to the external electronic device.

According to various example embodiments, the multiple resource groups may include at least one subcarrier which is not consecutive to at least one subcarrier included in a different resource group.

According to various example embodiments, the information related to the multiple resource groups may include an index of a subcarrier at a start point among at least one subcarrier included in each resource group, and an index of a subcarrier at a last point.

According to various example embodiments, the identifying of the at least one subcarrier may include determining that the constructive interference has occurred in the subcarriers, the channel gains of which satisfy a designated first condition, among the multiple subcarriers.

According to various example embodiments, the identifying of the at least one subcarrier may include: identifying subcarriers having local peaks among the multiple subcarriers, and detecting, based on channel gains of the subcarriers having the local peaks, the subcarriers in which the constructive interference is determined to have occurred.

According to various example embodiments, the identifying of the at least one subcarrier may include: identifying multiple resource areas configured in the frequency resource, and selecting, based on channel gains of subcarriers included in the resource areas, resource areas in which the constructive interference is determined to have occurred.

According to various example embodiments, the short-range wireless communication may include short-range wireless communication based on an orthogonal frequency division multiple access (OFDMA) transmission scheme.

According to various example embodiments, information related to the at least one subcarrier may be included in a beamforming report, a signal field (SIG) of a physical (PHY) header, or a media access control (MAC) header.

While the disclosure has been illustrated and described with reference to various example embodiments, it will be understood that the various example embodiments are intended to be illustrative, not limiting. It will be further understood by those skilled in the art, that various changes in form and detail may be made without departing from the true spirit and full scope of the disclosure, including the appended claims, and their equivalents. It will also be understood that any of the embodiment(s) described herein may be used in conjunction with any other embodiment(s) described herein.

What is claimed is:

1. An electronic device comprising:
   memory storing instructions;
   a communication circuit; and
   at least one processor including processing circuitry and operatively connected to the memory and the communication circuit,
   wherein the instructions which, when executed by the at least one processor individually and/or collectively, cause the electronic device:
   receive a reference signal from an external electronic device via the communication circuit,
   identify channel gains of multiple subcarriers included in a frequency resource through a channel estimation based on the reference signal,
   identify, based on the channel gains of the subcarriers, subcarriers in which constructive interference is determined to have occurred,
   configure multiple resource groups each including at least one consecutive subcarrier among the identified subcarriers, and
   transmit information related to the multiple resource groups to the external electronic device via the communication circuit.

2. The electronic device of claim 1, wherein each multiple resource groups comprises at least one subcarrier which is not consecutive to at least one subcarrier included in a different resource group.

3. The electronic device of claim 1, wherein the information related to the multiple resource groups comprises an index of a subcarrier at a start point among at least one subcarrier included in each resource group, and an index of a subcarrier at a last point.

4. The electronic device of claim 1, wherein the instructions, when executed by the at least one processor, cause the electronic device to determine that the constructive interference has occurred in the subcarriers, the channel gains of which satisfy a designated first condition, among the multiple subcarriers.

5. The electronic device of claim 1, wherein the instructions, when executed by the at least one processor, cause the electronic device to:
   identify subcarriers having local peaks among the multiple subcarriers, and
   detect, based on channel gains of the subcarriers having the local peaks, the subcarriers in which the constructive interference is determined to have occurred.

6. The electronic device of claim 1, wherein the instructions, when executed by the at least one processor, cause the electronic device to:
   identify multiple resource areas configured in the frequency resource, and
   select, based on channel gains of subcarriers included in the resource areas, resource areas in which the constructive interference is determined to have occurred.

7. The electronic device of claim 1, wherein the communication circuit is configured to support short-range wireless communication based on an orthogonal frequency division multiple access (OFDMA) transmission scheme.

8. The electronic device of claim 1, wherein information related to the multiple resource groups is included in a beamforming report, a signal field (SIG) of a physical (PHY) header, or a media access control (MAC) header.

9. A method of operating an electronic device, the method comprising:
   receiving a reference signal from an external electronic device via short-range wireless communication,
   identifying channel gains of multiple subcarriers included in a frequency resource through a channel estimation based on the reference signal,
   identifying, based on the channel gains of the subcarriers, subcarriers in which constructive interference is determined to have occurred,
   configuring multiple resource groups each including at least one consecutive subcarrier among the identified subcarriers, and
   transmitting information related to the multiple resource groups to the external electronic device.

10. The method of claim 9, wherein each multiple resource groups comprises at least one subcarrier which is not consecutive to at least one subcarrier included in a different resource group.

11. The method of claim 9, wherein the information related to the multiple resource groups comprises an index of a subcarrier at a start point among at least one subcarrier included in each resource group, and an index of a subcarrier at a last point.

12. The method of claim 9, wherein the identifying of the at least one subcarrier comprises determining that the constructive interference has occurred in the subcarriers, the channel gains of which satisfy a designated first condition, among the multiple subcarriers.

13. The method of claim 9, wherein the identifying of the at least one subcarrier comprises:

identifying subcarriers having local peaks among the multiple subcarriers, and detecting, based on channel gains of the subcarriers having the local peaks, the subcarriers in which the constructive interference is determined to have occurred.

14. The method of claim 9, wherein the identifying of the at least one subcarrier comprises identifying multiple resource areas configured in the frequency resource, and selecting, based on channel gains of subcarriers included in the resource areas, resource areas in which the constructive interference is determined to have occurred.

15. The method of claim 9, wherein information related to the multiple resource groups is included in a beamforming report, a signal field (SIG) of a physical (PHY) header, or a media access control (MAC) header.

16. The method of claim 9, wherein the short-range wireless communication comprises short-range wireless communication based on an orthogonal frequency division multiple access (OFDMA) transmission scheme.

17. An electronic device comprising:

memory storing instructions;

a communication circuit; and at least one processor including processing circuitry and operatively connected to the memory and the communication circuit, wherein the instructions which, when executed by the at least one processor individually and/or collectively, cause the electronic device to:

transmit a reference signal via the communication circuit, receive information related to multiple resource groups including at least one subcarrier in which constructive interference is determined to have occurred in a frequency resource by each respective one of multiple external electronic devices, based on the reference signal, select an external electronic device to which a wireless resource is to be allocated among the multiple external electronic devices, and allocate a wireless resource to the external electronic device, based on the information related to multiple resource groups, which is received from the external electronic device.

18. The electronic device of claim 17, wherein each of the multiple resource groups comprises at least one consecutive subcarrier in which the constructive interference is determined to have occurred by the external electronic device, and wherein the multiple resource groups comprise at least one subcarrier which is not consecutive to at least one subcarrier included in a different resource group.

19. The electronic device of claim 18, wherein the information related to multiple resource groups comprises an index of a subcarrier at a start point among at least one subcarrier included in each resource group, and an index of a subcarrier at a last point.

20. The electronic device of claim 17, wherein the communication circuit is configured to support short-range wireless communication based on an orthogonal frequency division multiple access (OFDMA) transmission scheme.

* * * * *